Patented Nov. 30, 1926.

1,609,097

UNITED STATES PATENT OFFICE.

ORIN F. STAFFORD, OF EUGENE, OREGON.

PROCESS OF MAKING CHARCOAL BRIQUETTES AND PRODUCT DERIVED THEREFROM.

No Drawing. Application filed July 15, 1922. Serial No. 575,323.

The present invention relates to the manufacture of charcoal briquettes, and has for its object the production of a charcoal briquette which shall burn without the formation of substantial amounts of smoke and which will have a sufficient degree of strength to be used as fuel, and which will retain sufficient strength, at or above a red heat, to prevent disintegration when used as fuel. In the preferred form of the invention, I aim to produce a smokeless charcoal briquette which can be used as fuel in the blast furnace, although, if course, its use for any other purpose is not disclaimed.

It is well recognized that the fabrication of charcoal briquettes in any manner presents difficulties which are harder to overcome than if denser fuels such as coal, coke, etc., were to be briquetted. This is proved by the fact that the briquetting of coal and coke is a well established industry, whereas many indeed are the failures that are recorded in the attempts that have been made to manufacture charcoal briquettes and very few are the instances of success.

Many binders have been proposed and used, actually in manufacture or experimentally, in the manufacture of fuel briquettes. Among these are various tars and pitches, asphalt, sulphite liquor residue, gums of various sorts, starch, residues from sugar manufacture, etc.

It is characteristic of the use of binders such as tar, pitch, asphalt, etc., that probably because of the porous and absorbent nature of charcoal, the amount of binder required is inordinately large as compared with the corresponding requirements for binding coal or even coke.

Briquettes bound with such large amounts of a tarry binder burn with a smoky flame which is objectionable. It is possible to subject them, before use, to a heating process, in the course of which certain oils and other constituents are volatilized, leaving a residue intimately in contact with the charcoal particles which residue eventually, under the continued influence of heat, assumes the character of carbon or coke. Such carbon or coke then acts as the final binding medium and would be expected to give a good product, since briquettes so made apparently should be mechanically strong at all temperatures, should be waterproof, should burn at all stages without smoke formation, etc.

As a matter of fact, however, there are difficulties attending the above process of manufacture. For example, the heavily tar-bound product of the first stage of manufacture while strong enough cold, may become unduly soft and plastic when warm, disintegrating, even, during the course of heating up for the step of carbonizing the tar binder. It is to overcome this difficulty as well as to secure other desirable features that the present invention was conceived and perfected.

Among the binders other than tar, pitch, petroleum, residues or asphalt, starch particularly has proved itself desirable as a binder for fuel briquettes. Used in much smaller percentages than is necessary in the case of tar, etc., starch (with water) forms a plastic mass with charcoal, which presses well and which hardens upon mere drying to give a product possessing admirable mechanical strength. There are, however, three principal objections to starch as a binder: (a) the briquettes smoke somewhat when first kindled; (b) they disintegrate upon contact with water; and (c) they lose in mechanical strength when heated to incandescence. This last point, particularly, is a serious difficulty if the briquettes are to be used at high temperatures and under considerable pressures, as in a blast furnace.

I have found, however, that it is possible to take advantage of the obvious favorable properties of starch as a binder in charcoal briquette manufacture by using it in relatively small amounts in order to secure good results in pressing and in the formation of a product having good mechanical strength or structure at all temperatures below the temperatures needed for the coking or carbonizing of tars and pitches. In addition to such necessary small amount of starch, I find that any desired amount of tar or pitch may be added without interfering materially with the production of the characteristic starch briquette structure. Instead of thirty or forty per cent of tar or pitch, for example, which would be necessary to get a charcoal briquette if tar or pitch alone were used as a binder, I can add less, if desired, say, five per cent, or fifteen per cent, or any other amount.

It will thus be seen that in accordance with the present invention, I employ (1) charcoal, (2) starch, and (3) tar, pitch or asphalt. Some water is also, of course, needed to render the starch adhesive.

The charcoal may be any small charcoal suitably smaller than the size of the briquettes to be made. The charcoal made from comminuted wood, e. g., sawdust, hogged wood, mill waste, etc., can be used. This is preferably, at least in part, in the form of a powder.

Starch in its pure form, or relatively pure, or starchy materials such as low grade flour, etc., also can be employed.

Tar, such as coal tar, wood tar, or the residues of this after extracting the more volatile and more valuable constituents; pitches from coal or wood tar, petroleum refining, asphalts, etc., can be used. When raw tars are used, they, of course, will be converted into pitches by the heating operations. These are hereinafter embraced in the term "tar material".

The use of starch gives good physical properties, it gives a mixture which presses well in the molds, and leaves a good physical structure. However, when briquettes bound with starch alone are heated, they lose greatly in mechanical strength, so that briquettes made from charcoal with a starch binder alone, might not have the necessary strength to stand up in the blast furnace.

A procedure used in making the briquette mixture as I have developed it, consists in first adding the tar or pitch in any convenient manner and thoroughly incorporating it with the charcoal. If tar is used it is advantageous to add it hot to the charcoal also in a warm condition. Pitch may be added in the same manner, or it may be reduced to a powder and mixed with the charcoal.

To the mixture of tar or pitch with charcoal, starch is added and incorporated. The starch may be added as a dry powder followed by the addition of hot water or steam until sufficient water is present to moisten the whole mass and give it desirable plasticity; the starch may be mixed with water previously and heated until a paste is produced, this paste then being incorporated with the mixture of tar or pitch with charcoal.

While I have given herewith certain order, by way of illustration, for the admixture of the constituents of the briquetting mixture I wish to emphasize the fact that any order of admixture is permissible without departing from the spirit of my invention.

Owing, doubtless, to the very porous and absorbent character of charcoal a much larger amount of water is required to give a plastic mass than would be needed if coal were used. Instead of 6% of water in the briquetting mixture for example, it is necessary to have 30% more or less, based on the weight of the dry materials.

Thus for example, I may take 800 pounds of charcoal, of which 50% or so is in the form of powder, say not substantially coarser than ordinary sand, or all in powder form, if so desired, and add 150 to 350 or 400 pounds of wood tar or say half this amount of wood tar pitch. These are well mixed as above referred to, and from 15 to 35 or even 50 pounds of starch are then added, and well mixed. Then from 200 to 800 pounds of water, (say about 450 lbs.) are added, and well mixed while heating the mass, e. g., by introducing steam. The heating may be carried up to 85 to 100° C., more or less, whereby they develop strength significantly owing to the binding power of the starch. The mass is molded as above described, into briquettes. The briquettes can, if desired, be partly or wholly dried, in the open air, e. g., in a warm room or in the sun, or in any common drying shed. In order to make the tar or pitch effective as a binder, in the manner contemplated by this invention however, these preliminary starch bound briquettes are heated up to a temperature of 300° to 400° C., or above, whereupon the tar or pitch is carbonized to charcoal or coke itself thereby producing a binder effective at any higher temperature. Since the binder is essentially coked carbon, these briquettes are stable and strong at high temperatures.

In the above example I mention the use of wood tar, not because it is essentially a better material to use as a binder than any of the other "tarry materials" previously cited, but for the reason that it is available as a by-product of the manufacture of the charcoal itself. This particular "tar material", moreover, upon being carbonized within the briquette, yields practically a carbonaceous residue of the character of charcoal so that the product eventually is a pure charcoal briquette.

In many of the plants making wood charcoal the wood tar produced is used in place of coal or other commercial fuel for steam production heating retorts, etc., and consequently has no greater value than such fuels. By using it as a binder as I propose, however, it is converted into its equivalent of valuable charcoal thereby increasing materially the value of the plant output.

Another of the objects that I seek in this procedure of briquette manufacture when wood tar is used as binder, is the avoidance of the tar distilling operation which is troublesome and expensive. This I accomplish in the course of the heating up of the briquettes made with starch and tar in an appliance provided with vapor outlets whereby the oils, etc., distill out of the briquettes just as they would distill out of the tar were it in a regular still. The vapors evolved can be condensed and collected. The final temperatures of the appliance are then carried to the point where the tar residue of a non-volatile character remaining in the briquettes carbonizes to produce the carbon binder that eventually is desired.

I have used the terms "tar or pitch" throughout for the reason that the tar is regularly converted into pitch by distilling it until oils and other volatile products are removed to a greater or less degree, the residue in the still being pitch. The close relationship between these materials makes the use of both terms really necessary.

I make no claim herein to any manufacture of briquettes from anthracite or bituminous coal or coke.

I claim:

1. A process of making charcoal briquettes which comprises incorporating comminuted charcoal, tar material, starch and water, in such proportions as to produce a plastic mass, molding the same and drying the product.

2. A process of making charcoal briquettes which comprises incorporating comminuted charcoal, wood, tar material, starch and water, in such proportions as to produce a plastic mass, molding the same and drying the product.

3. A process of making charcoal briquettes which comprises incorporating comminuted charcoal, tar material, starch and water, in such proportions as to produce a plastic mass, molding the same, drying the product and heating the molded product sufficiently to carbonize the binder.

4. A charcoal briquette comprising a mass of charcoal bonded by coky substance derived from the carbonization of tar material and starchy material, such briquette being of sufficient strength, at all temperatures up to that of the hottest zone of an ordinary blast furnace, to be mechanically stable therein.

5. A process of preparing charcoal briquettes which comprises forming a plastic mixture containing 800 parts of charcoal in a comminuted state, a tarry material equivalent to about 75 to 200 parts of wood tar pitch, about 15 to 50 parts of starch and about 200 to 800 parts of water, such mass being heated to about 85° C. to 100° C., molded, dried and heated to at least about 300° C.

6. A charcoal briquette containing 800 parts of comminuted charcoal, tarry material equivalent to about 75 to 200 parts of wood tar pitch, and about 15 to 50 parts of starch, such briquette, after heating to 300–400° C., being of a sufficient strength to burn without crumbling in a blast furnace under blast furnace conditions.

7. A charcoal briquette containing comminuted charcoal mixed with tarry material and a smaller amount of starch, such briquette after heating to 300–400° C., being of a sufficient strength to burn in a blast furnace under ordinary blast furnace conditions, without crumbling.

In testimony whereof I affix my signature.

ORIN F. STAFFORD.